(12) United States Patent
Zhang et al.

(10) Patent No.: US 10,354,462 B1
(45) Date of Patent: Jul. 16, 2019

(54) FAULT DIAGNOSIS IN POWER ELECTRONICS USING ADAPTIVE PCA

(71) Applicants: Toyota Motor Engineering & Manufacturing North America, Inc., Plano, TX (US); University of Connecticut, Farmington, CT (US)

(72) Inventors: Lingyi Zhang, Farmington, CT (US); Weiqiang Chen, Farmington, CT (US); Krishna Pattipatti, Farmington, CT (US); Ali M. Bazzi, Farmington, CT (US); Shailesh N. Joshi, Ann Arbor, MI (US); Ercan M. Dede, Ann Arbor, MI (US)

(73) Assignees: TOYOTA MOTOR ENGINEERING & MANUFACTURING NORTH AMERICA, INC., Plano, TX (US); UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 15/947,702

(22) Filed: Apr. 6, 2018

(51) Int. Cl.
 *G07C 5/08* (2006.01)
 *G06N 20/00* (2019.01)
 *G07C 5/00* (2006.01)

(52) U.S. Cl.
 CPC .......... *G07C 5/0808* (2013.01); *G06N 20/00* (2019.01); *G07C 5/008* (2013.01); *G07C 5/085* (2013.01); *G07C 5/0816* (2013.01)

(58) Field of Classification Search
 CPC .... G07C 5/0808; G07C 5/008; G07C 5/0816; G07C 5/085; G06N 20/00
 (Continued)

(56) References Cited

U.S. PATENT DOCUMENTS

| 4,379,990 A | 4/1983 | Sievers et al. |
| 6,732,063 B2 | 5/2004 | Famili et al. |

(Continued)

FOREIGN PATENT DOCUMENTS

| CN | 104778337 | 7/2015 |
| CN | 105675038 | 6/2016 |
| CN | 106169001 | 11/2016 |

OTHER PUBLICATIONS

Alkaya et al.; "Variance Sensitive Adaptive threshold-Based PCA Method for Fault Detection with Experimental Application"; *ISA Transactions*; vol. 50; pp. 287-302 ; (2011).
(Continued)

*Primary Examiner* — Yazan A Soofi
(74) *Attorney, Agent, or Firm* — Snell & Wilmer LLP

(57) ABSTRACT

A system includes an electronic device and a sensor to detect sensor data corresponding to the electronic device. The system also includes a machine learning processor that receives the sensor data and generates a model of the electronic device to determine a T squared threshold and a Q threshold using a machine learning algorithm. The machine learning processor also performs a T squared analysis of the electronic device by comparing a T squared value to the T squared threshold, and a Q analysis of the electronic device by comparing a Q value to the Q threshold. The machine learning processor also determines that the model is faulty when the T squared value is less than the T squared threshold and the Q value is greater than or equal to the Q threshold, and generates a new model or updates the model when the model is determined to be faulty.

20 Claims, 8 Drawing Sheets

(58) Field of Classification Search
USPC .................................................... 701/32.9
See application file for complete search history.

(56) References Cited

U.S. PATENT DOCUMENTS

| | | | |
|---|---|---|---|
| 7,233,886 B2 | 6/2007 | Wegerich et al. | |
| 7,260,501 B2 | 8/2007 | Pattipatti et al. | |
| 7,715,961 B1* | 5/2010 | Kargupta | G06Q 10/08 |
| | | | 303/152 |
| 8,301,333 B2* | 10/2012 | Singh | G07C 5/0808 |
| | | | 701/31.4 |
| 8,301,406 B2 | 10/2012 | Lee et al. | |
| 8,509,985 B2 | 8/2013 | Subramania et al. | |
| 8,543,282 B2 | 9/2013 | Hansson et al. | |
| 8,600,685 B2 | 12/2013 | Kalgren et al. | |
| 8,880,054 B2 | 11/2014 | Wesby | |
| 9,194,376 B2 | 11/2015 | Ritter et al. | |
| 9,256,224 B2* | 2/2016 | Herzog | G05B 23/0283 |
| 9,471,452 B2* | 10/2016 | McElhinney | G06F 11/0751 |
| 9,489,340 B2 | 11/2016 | Safa-Bakhsh et al. | |
| 9,729,639 B2 | 8/2017 | Sustaeta et al. | |
| 2005/0273277 A1 | 12/2005 | Ridnour et al. | |
| 2014/0253109 A1* | 9/2014 | Singh | G01R 15/20 |
| | | | 324/227 |
| 2016/0035152 A1* | 2/2016 | Kargupta | G06F 16/25 |
| | | | 701/31.5 |
| 2016/0093117 A1 | 3/2016 | Ahn et al. | |
| 2016/0195857 A1* | 7/2016 | Gandhi | G05B 13/041 |
| | | | 700/31 |
| 2018/0012137 A1* | 1/2018 | Wright | G05B 13/0265 |

OTHER PUBLICATIONS

Angelov et al.; "An Approach to Model-Based Fault Detection in Industrial Measurement Systems with Application in Engine Test Benches"; *Meas. Sci.Technol.*; vol. 17; 1809-1818; 2006.

Antory et al.; "Diagnosis of CAM Profile Switching of an Automobile Gasoline Engine"; 6 pages.

Bakdi et al.; "Improved Process Monitoring Using PCA Methods and Adaptive Threshold Scheme"; *The 5th International Conference on Electrical Engineering—Boumerdes (ICEE-B)*; Oct. 29-31, 2017.

Elshenawy et al.; "Efficient Recursive Principal Component Analysis Algorithms for Process Monitoring"; *Ind. Eng. Chem. Res.*; vol. 19; pp. 252-259; 2010.

Fu et al.; "Principal Component Analysis Based on Drive Cycles for Hybrid Electric Vehicle"; IEEE; pp. 1613-1618; 2009.

Hashemi et al.; "Adaptive Threshold-Based Fault Detection and Isolation for Automotive Electrical Systems"; *Proceedings of the 8th World Congress on Intelligent Control and Automation IEEE*; pp. 1013-1018; Jun. 21-25, 2011.

Ho, Lok Man; "Application of Adaptive Thresholds in Robust Fault Detection of an Electro-Mechanical Single-Wheel Steering Actuator"; *8th IFAC Symposium on Fault Detection, Supervision and Safety of Technical Processes*; pp. 259-264; Aug. 29-31, 2012.

Huang et al.; "An Intelligent Multifeature Statistical Approach for the Discrimination of Driving Conditions of a Hybrid Electric Vehicle"; *IEEE Transactions on Intelligent Transportation Systems*; vol. 12, No. 20, Jun. 2011.

Kargupta et al.; "VEDAS: A Mobile and Distributed Data Stream Mining System for Real-time Vehicle Monitoring"; pp. 300-311.

Mohammadpour et al.; A Survey on Diagnostic Methods for Automotive Engines; *Int. J. Engine Res.*; vol. 00; pp. 1-24; 2010.

Mohan et al.; "A Comparison of Methods for Linear Cell-to-Cell Mapping and Application Example for Fault Detection and Isolation"; *European Conference of the Prognostics and Health Management Society*; 11 pages; 2014.

Shi et al.; "The Development of an Adaptive Threshold for Model-Based Fault Detection of Nonlinear Electro-Hydraulic System"; *Control Engineering Practice*; vol. 13; pp. 1357-1367; 2015.

Singh et al.; "Data-Driven Framework for Detecting Anomalies in Field Failure Data"; *IEEE Paper #1221*, Version 2; 14 pages; Jan. 3, 2011.

Svensson et al.; "Vehicle Diagnostics Method for Anomaly Detection and Fault Identification Software"; *SAE International*; 7 pages; 2009.

Fusco et al.; "An Approach to Design a Prognostic Based Maintenance Strategy for Railway Power Converter Unit"; *IEEE*; 6 pages; 2015.

Davis et al.; "Predictive & Prognostic Controller for Wide Band Gap (Silicon Carbide) Power Conversion"; *IEEE Aerospace Conf.*; 18 pages; 2007.

Lasheras et al.; "A Hybrid PCA-CART-MARS-Based Prognostic Approach of the Remaining Useful Life for Aircraft Engines"; Sensors (Basel); 15 (3), pp. 7062-7083, Mar. 2015.

\* cited by examiner

FAULT DIAGNOSIS IN POWER ELECTRONICS USING ADAPTIVE PCA

BACKGROUND

1. Field

The present disclosure relates to systems and methods for identifying electronic components of vehicles that are likely to fail within a predetermined amount of time and, more particularly, to systems and methods of redundant fault monitoring of such electronic components.

2. Description of the Related Art

Vehicles are becoming more reliant upon electronic devices. Such electronic devices may be subject to relatively large variations in ambient temperature, quantity of power cycles, frequency, and range of cycling. Conventional sensors are capable of sensing data usable to identify when the electronic device has already failed. However, the corresponding vehicle may operate undesirably in response to failure of the electronic device.

Certain models may exist for monitoring the status of such electronic devices. As data is received, it may be compared to the model to determine the status of a corresponding electronic device. However, such models may fail for various reasons. Comparing sensor data to a failed model may result in a false indication that the electronic device has failed or is likely to fail.

Thus, systems and methods for redundant fault detection for an electronic device of a vehicle are desirable.

SUMMARY

Described herein is a system for analyzing a health status of a component of vehicles. The system includes an electronic device. The system also includes a sensor designed to detect sensor data corresponding to at least one performance characteristic of the electronic device. The system also includes a memory designed to store a machine learning algorithm. The system also includes a machine learning processor coupled to the sensor. The machine learning processor is designed to receive the sensor data and generate, using the machine learning algorithm, a model of the electronic device to determine a T squared threshold and a Q threshold. The machine learning processor is also designed to perform a T squared analysis of the electronic device by comparing a T squared value to the T squared threshold, and to perform a Q analysis of the electronic device by comparing a Q value to the Q threshold. The machine learning processor is also designed to determine that the model of the electronic device is faulty when the T squared value is less than the T squared threshold and the Q value is greater than or equal to the Q threshold. The machine learning processor is also designed to generate a new model of the electronic device or update the model of the electronic device when the model of the electronic device is determined to be faulty.

Also disclosed is a system for analyzing a health status of a component of vehicles. The system includes an electronic device, and a sensor designed to detect sensor data corresponding to at least one performance characteristic of the electronic device. The system also includes a memory designed to store a machine learning algorithm. The system also includes a machine learning processor coupled to the sensor. The machine learning processor is designed to receive the sensor data, and to generate, using the machine learning algorithm, a principal component analysis (PCA) model of the electronic device to determine a reduced data matrix. The machine learning processor is also designed to determine a T squared threshold and a Q threshold based on the reduced data matrix. The machine learning processor is also designed to perform a T squared analysis of the electronic device by comparing a T squared value to the T squared threshold, and to perform a Q analysis of the electronic device by comparing a Q value to the Q threshold. The machine learning processor is also designed to determine that the PCA model of the electronic device is faulty when the T squared value is less than the T squared threshold and the Q value is greater than or equal to the Q threshold. The machine learning processor is also designed to generate a new PCA model of the electronic device or update the PCA model of the electronic device when the PCA model of the electronic device is determined to be faulty.

Also disclosed is a method for analyzing a health status of a component of vehicles. The method includes detecting, by a sensor, sensor data corresponding to at least one performance characteristic of an electronic device of a vehicle. The method also includes storing, in a memory, a machine learning algorithm. The method also includes receiving, by a machine learning processor, the sensor data. The method also includes generating, by the machine learning processor using the machine learning algorithm, a model of the electronic device to determine a T squared threshold and a Q threshold. The method also includes performing, by the machine learning processor, a T squared analysis of the electronic device by comparing a T squared value to the T squared threshold. The method also includes performing, by the machine learning processor, a Q analysis of the electronic device by comparing a Q value to the Q threshold. The method also includes determining, by the machine learning processor, that the model of the electronic device is faulty when the T squared value is less than the T squared threshold and the Q value is greater than or equal to the Q threshold. The method also includes at least one of generating, by the machine learning processor, a new model of the electronic device, or updating, by the machine learning processor, the model of the electronic device when the model of the electronic device is determined to be faulty.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for identifying faults in an electronic device of a vehicle using principal component analysis (PCA) modeling of the electronic device, and for identifying when the PCA model is faulty. Using PCA modeling is advantageous because it can predict failure of an electronic device earlier than use of conventional error detection algorithms. The systems provide several benefits and advantages such as real-time updating of the PCA model when the PCA model is determined to be faulty. This provides the benefit of having a model that can be assumed to always be accurate, thus reducing the quantity of false alarms (i.e., reducing erroneous false error detections). The systems may further be capable of performing an alternative error detection algorithm to determine a status of the electronic device when the model is faulty, advantageously providing redundant fault detection of the electronic device.

An exemplary system includes a vehicle having an electronic component and a sensor that is designed to detect sensor data that corresponds to the electronic component (such as a voltage, current, temperature, or the like). The system also includes a machine learning processor which may be located on the vehicle (and referred to as a machine learning electronic control unit (ML-ECU)) or may be located remote from the vehicle within a machine learning server. The machine learning processor may receive data from the sensor and may build a PCA model of the electronic device. The machine learning processor may analyze newly received data based on the PCA model and may determine whether a fault has occurred or is likely to occur with the electronic device based on the analysis. The machine learning processor may further identify whether the PCA model is faulty based on the analysis.

Figure 1:
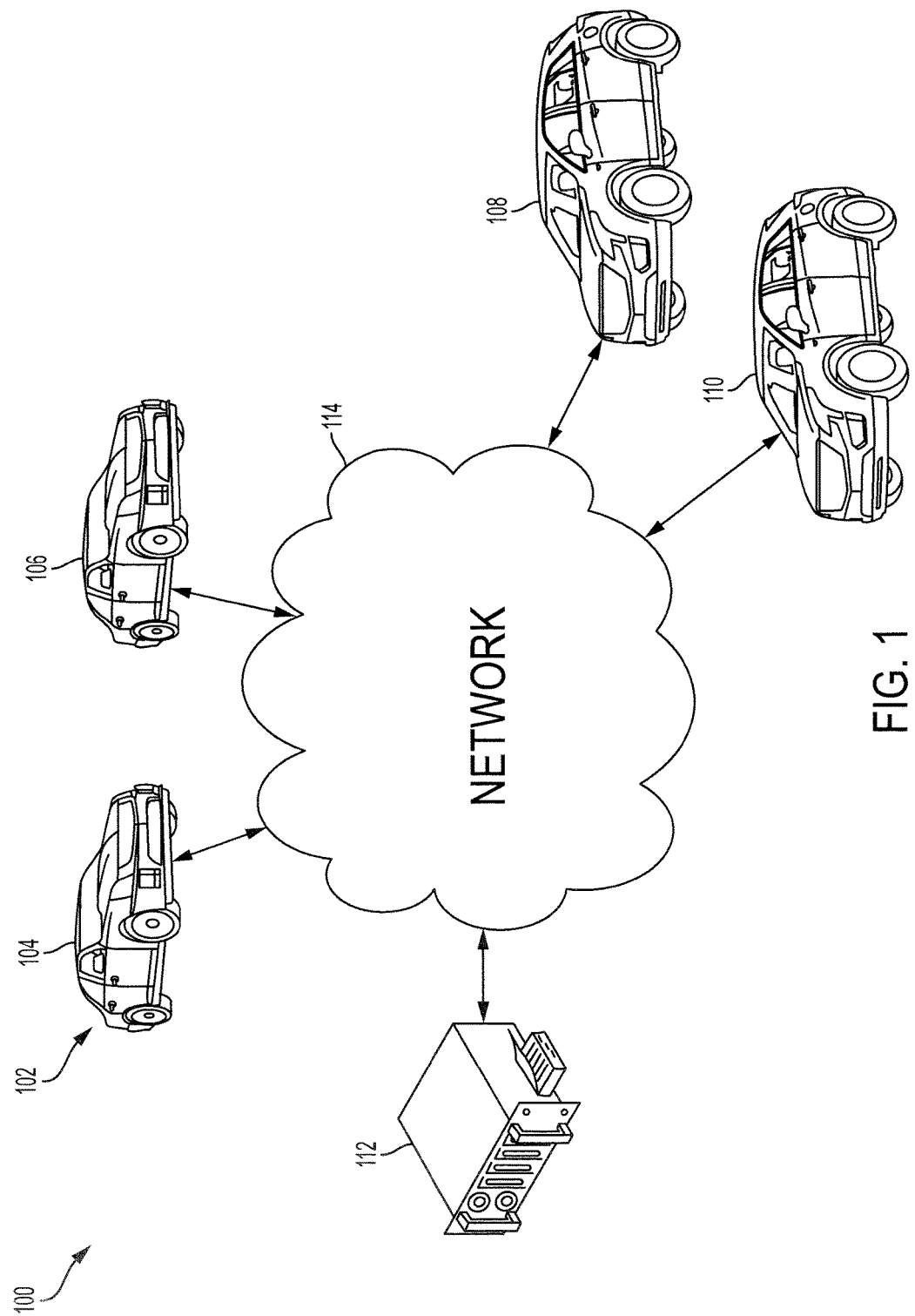
FIG. 1 is a block diagram illustrating a system for using distributed machine learning to identify when faults are likely to occur with electronic devices of vehicles according to an embodiment of the present invention.

Turning to FIG. 1, a system 100 for analyzing a health status of one or more component of vehicles is shown. In particular, the system 100 includes one or more vehicles 102 including a first vehicle 104, a second vehicle 106, a third vehicle 108, and a fourth vehicle 110, as an example. The first vehicle 104 and the second vehicle 106 may be of a first type, such as a Prius (or a sedan), and the third vehicle 108 and the fourth vehicle 110 may be of a second type, such as a Tundra (or a truck).

The system 100 may further include a machine learning server 112. The machine learning server 112 may communicate with each of the vehicles 102 via a network 114. The machine learning server 112 may be designed to receive data from each of the vehicles 102, such as sensor data corresponding to electronic components of the vehicles 102. The machine learning server 112 may design a model of the electronic devices based on the sensor data, and may analyze the health status of the electronic devices by comparing the sensor data to the model. In some embodiments, each of the vehicles 102 may include a machine learning processor (referred to as a ML-ECU) that can design the model of the electronic devices and analyze the health status of the electronic devices.

The machine learning server 112 (or ML-ECU of each vehicle 102) may identify when a fault is likely to occur with the electronic device of one or more of the vehicles 102 based on the comparison. The machine learning server 112 may then transmit a signal to the corresponding vehicle 102 such that the vehicle 102 can output data indicating that the fault is likely to occur with the corresponding electronic component.

Figure 2:
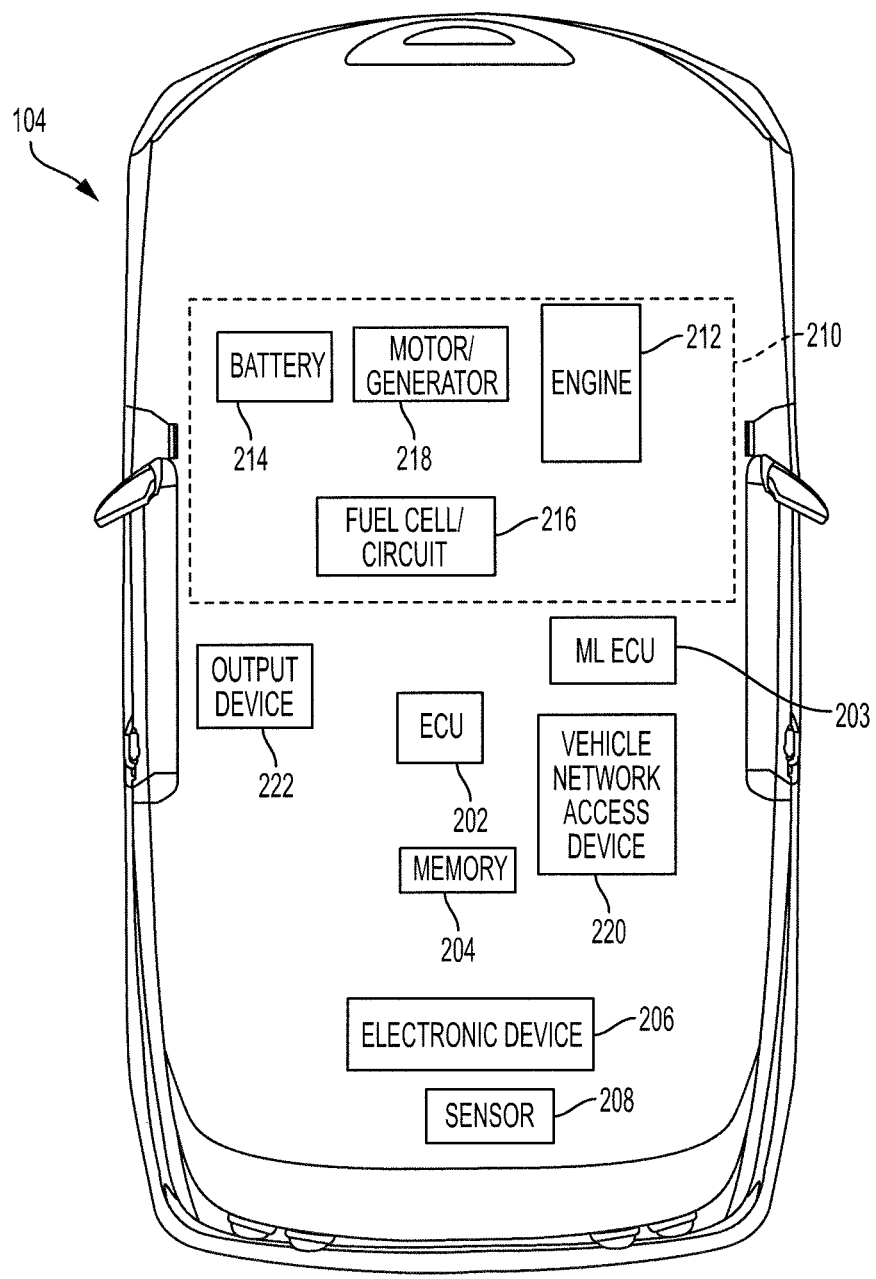
FIG. 2 is a block diagram illustrating an exemplary vehicle designed for use with the system of FIG. 1 according to an embodiment of the present invention.

Referring now to FIG. 2, the vehicle 104 may include an electronic control unit (ECU) 202, a ML-ECU 203, a memory 204, an electronic device 206, and a sensor 208. The vehicle 104 may further include a power source 210 which may include one or more of an engine 212, a battery 214, a fuel cell circuit 216, or a motor generator 218. In some embodiments, the vehicle 104 may be an electric vehicle, a hybrid vehicle, a plug-in hybrid vehicle, or the like. The vehicle 104 may further include a vehicle network access device 220 and an output device 222.

The ECU 202 may be coupled to each of the components of the vehicle 100 and may include one or more processors or controllers, which may be specifically designed for automotive systems. The functions of the ECU 202 may be implemented in a single ECU or in multiple ECUs. The ECU 202 may receive data from components of the vehicle 100, may make determinations based on the received data, and may control the operation of components based on the determinations.

In some embodiments, the vehicle 104 may be fully autonomous or semi-autonomous. In that regard, the ECU 202 may control various aspects of the vehicle 100 (such as steering, braking, accelerating, or the like) to maneuver the vehicle 100 from a starting location to a destination.

The ML-ECU 203 may, be implemented in the ECU 202 or may be a separate component. The ML-ECU 203 may include one or more processors or controllers, or other logic device, capable of performing machine learning functions. For example, the ML-ECU 203 may perform machine learning functions such as creating models of various devices within the vehicle 104, analyzing detected data using the models to predict failure of the devices, and the like.

The memory 204 may include any non-transitory memory and may be capable of storing data usable by the ECU 202. For example, the memory 204 may store instructions usable by at least one of the ECU 202 or the ML-ECU 203. In some embodiments, the ML-ECU may include a separate memory.

The engine 212 may convert a fuel into mechanical power. In that regard, the engine 212 may be a gasoline engine, a diesel engine, or the like.

The battery 214 may store electrical energy. In some embodiments, the battery 214 may include any one or more energy storage device including a battery, a fly-wheel, a super-capacitor, a thermal storage device, or the like.

The fuel cell circuit 216 may include a plurality of fuel cells that facilitate a chemical reaction to generate electrical energy. For example, the fuel cells may receive hydrogen and oxygen, facilitate a reaction between the hydrogen and oxygen, and output electricity in response to the reaction. In that regard, the electrical energy generated by the fuel cell circuit 216 may be stored in the battery 214. In some embodiments, the vehicle 100 may include multiple fuel cell circuits including the fuel cell circuit 216.

The motor-generator 118 may convert the electrical energy stored in the battery 214 (or electrical energy received directly from the fuel cell circuit 216) into mechanical power usable to propel the vehicle 104. The motor-generator 118 may further convert mechanical power received from the engine 212 or wheels of the vehicle 104 into electricity, which may be stored in the battery 214 as energy and/or used by other components of the vehicle 104. In some embodiments, the motor-generator 118 may also or instead include a turbine or other device capable of generating thrust.

The vehicle network access device 220 may include any port or device capable of facilitating communications between the ECU 202 and an external device (such as the machine learning server 112 of FIG. 1). For example, the vehicle network access device 220 may communicate via Wi-Fi, Bluetooth, a cellular protocol, a vehicle to vehicle protocol, 4G, 5G, or the like.

The output device 222 may include any output device such as a speaker, a display, an LED indicator, or the like. The output device 222 may output data as instructed by the ECU 202.

The electronic device 206 may include any electronic device included in the vehicle 104. In that regard and in some embodiments, the electronic device 206 may be incorporated or included in another component of the vehicle 104 such as the fuel-cell circuit 116, the battery 214, the motor generator 218, or the like. In some embodiments, the electronic device 206 may include a printed circuit board (PCB) with one or more logic device coupled thereto. In some embodiments, the electronic device 206 may include a power device such as a power converter, a transformer, a coil, or the like. For example, the electronic device 206 may include a semiconductor component or a power converter.

The sensor 208 may be coupled to the electronic device 206. For example, the sensor 208 may be positioned on the electronic device 206, integrated with the electronic device 206, positioned in line with the electronic device 206, positioned adjacent to the electronic device 206, or the like. The sensor 208 may detect data corresponding to performance characteristics of the electronic device 206. For example, the sensor 208 may detect one or more of a cycling current of the electronic device 206, a temperature of the electronic device 206, a thermal resistance of the electronic device 206, a power step of the electronic device 206, a voltage level of the electronic device 206, a current level of the electronic device 206, a cycle count of the electronic device 206, or the like.

Figure 3:
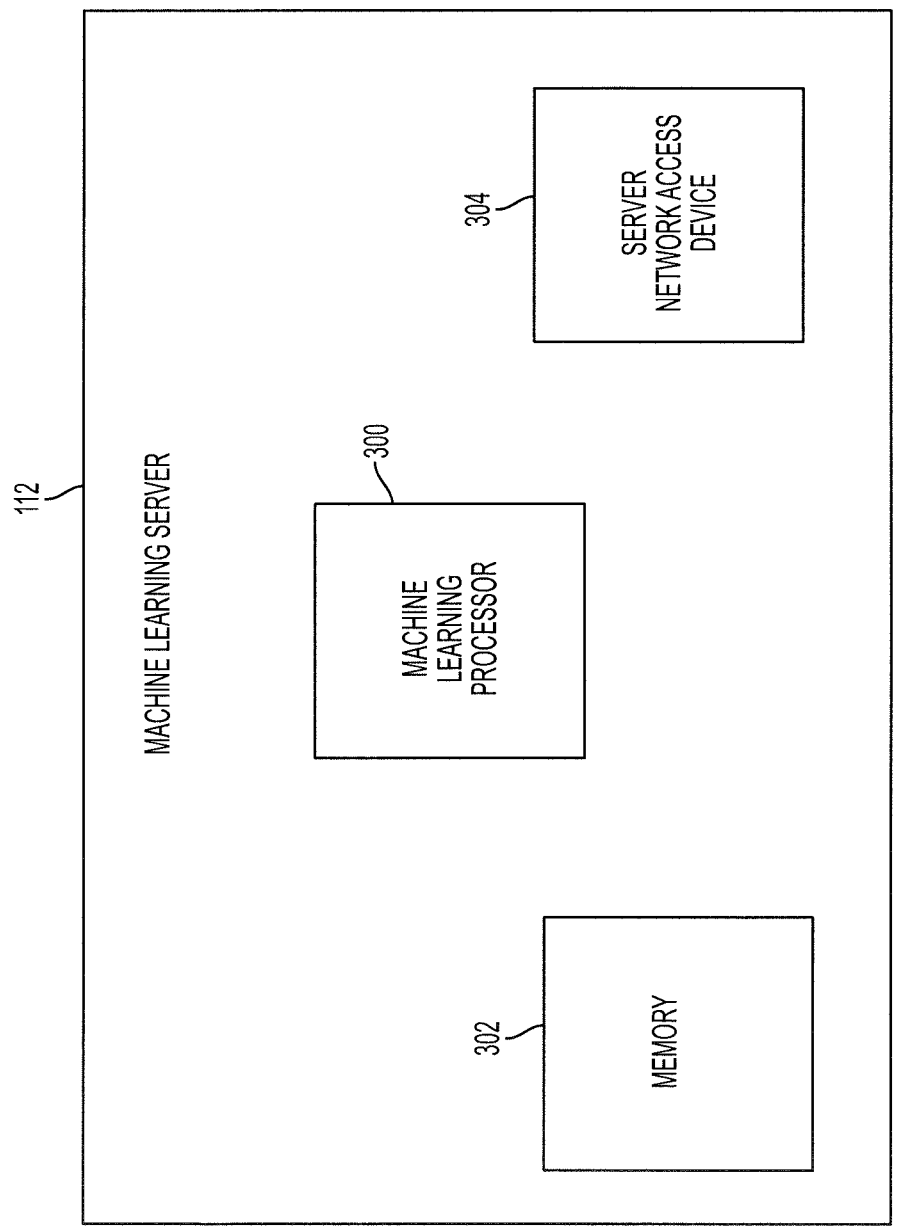
FIG. 3 is a block diagram illustrating a machine learning server designed for use with the system of FIG. 1 according to an embodiment of the present invention.

Referring to FIGS. 1 and 2, the machine learning server 112 (or the ML-ECU 203) may receive detected data from the sensor 208. The machine learning server 112 (or the ML-ECU 203) may initially build a model of the electronic device 206 based on the received sensor data. The machine learning server 112 (or the ML-ECU 203) may continue to receive the data from the sensor 208 and may identify when a fault is likely to occur with the electronic device 206 based on the received sensor data. The machine learning server 112 (or the ML-ECU 203) may then transmit a message to the ECU 202 via the vehicle network access device 220 indicating that the fault is likely to occur with the electronic device 206. The ECU 202 may then control the output device 222 to output data indicating that the fault is likely to occur with the electronic device 206 such that an operator of the vehicle 104 may take the vehicle 104 to a service center for service. In that regard, the operator can get the electronic device 206 replaced or repaired Turning now to FIG. 3, various features of the machine learning server 112 are illustrated. In particular, the machine learning server 112 includes a machine learning processor 300, a memory 302, and a server network access device 304.

The machine learning processor 300 may receive the data transmitted from the sensors of the vehicles 102 of FIG. 1. The machine learning processor 300 may store the data in the memory 302, may analyze the data, and may generate a model of the electronic device based on the received data. The machine learning processor 300 may then store the model in the memory 302. The machine learning processor 300 may continue to receive the sensor data and may identify when faults are likely to occur by comparing the sensor data to the model stored in the memory 302. In some embodiments, the ML-ECU of a corresponding vehicle may instead perform some or all of these steps.

The memory 302 may include any non-transitory memory. In that regard, the memory 302 may store data usable by the machine learning processor 300. For example, the memory 302 may store the model of the electronic device for each of the vehicles 102 of FIG. 1. In some embodiments, the memory 302 may store a single model that corresponds to the electronic component of the first vehicle 104 and the second vehicle 106, and a single model that corresponds to the electronic component of the third vehicle 108 and the fourth vehicle 110. In some embodiments, the memory 302 may store a model of the electronic device that is the same for each of the vehicles 102. In some embodiments, the memory 302 may store a separate model for each of the vehicles 102.

The server network access device 304 may include any port or device capable of facilitating communications between the machine learning processor 300 and an external device (such as one or more of the vehicles 102 of FIG. 1). For example, the server network access device 304 may communicate via Wi-Fi, Bluetooth, a cellular protocol, a vehicle to vehicle protocol, 4G, 5G, or the like.

Figure 4:
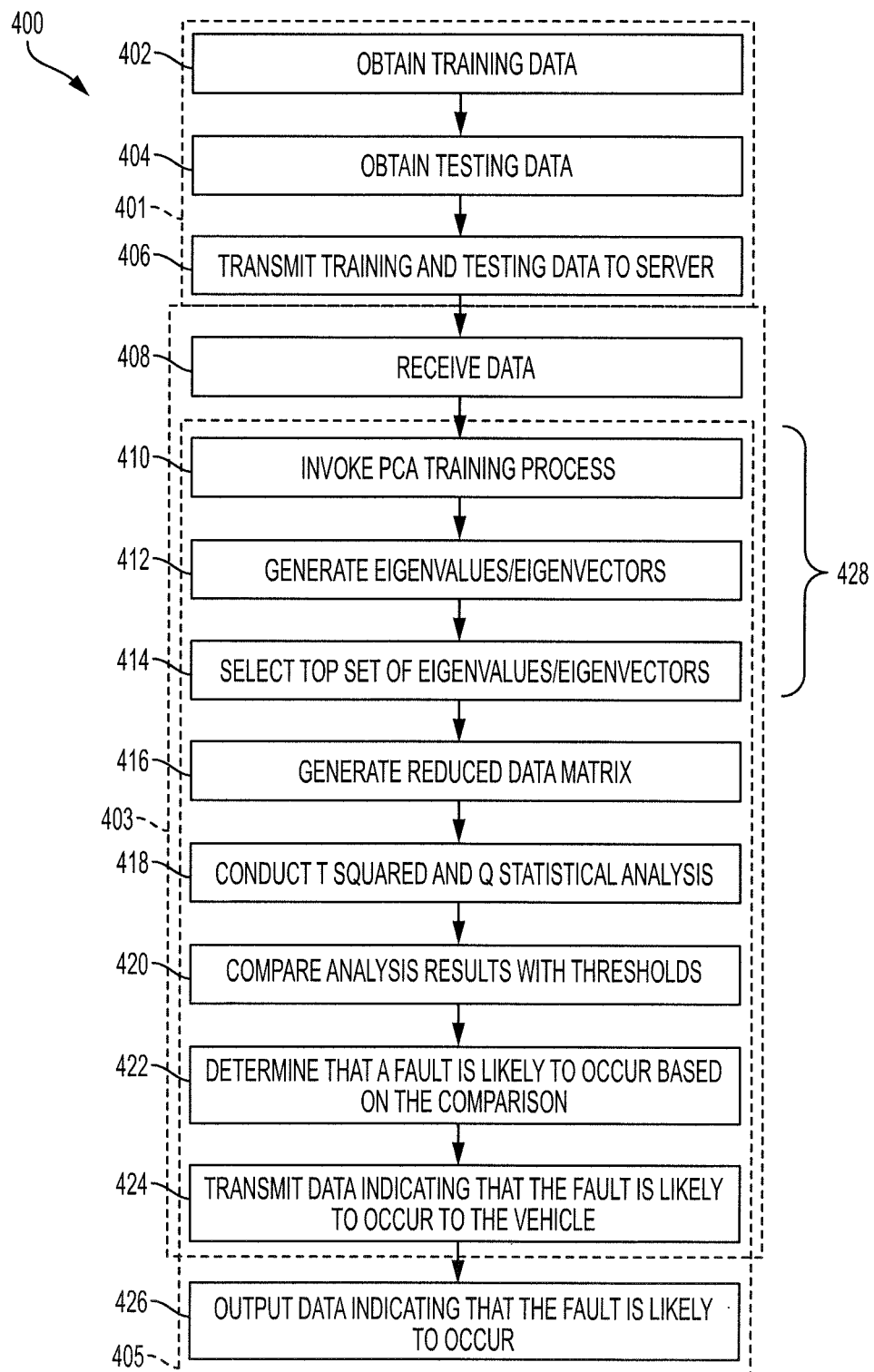
FIG. 4 is a flowchart illustrating a method for using distributed machine learning to identify when faults are likely to occur with electronic components of vehicles according to an embodiment of the present invention.

Turning now to FIG. 4, a method 400 for conducting fault monitoring of an electronic device of a vehicle is shown. In some embodiments, a first portion 401 of the method 400 may be performed by a vehicle or a component thereof, a second portion 403 may be performed by a machine learning server or a component thereof, and a third portion 405 may be performed by the vehicle or a component thereof. In some embodiments, some or all of blocks 410 through 424 may be performed by the vehicle, and in some embodiments some or all of blocks 410 through 424 may be performed by the machine learning server. For example, blocks 410 through 416 may be performed by the machine learning server, and blocks 418-424 may be performed by the vehicle.

The division of the various blocks into the first portion 401, the second portion 403, and the third portion 405 may allow for computationally expensive processes (such as the processes performed in the second portion 403) to be performed by the machine learning server which may have a greater capacity for performing such processes.

The training data may be received in block 402 and testing data may be received in block 404. The training data and the testing data may generally be the data that is received from the one or more sensors positioned on, integrated with, positioned in line with, or positioned adjacent to the electronic device. Accordingly, the training data and the testing data may be collectively referred to herein as sensed or detected data. In some embodiments, the training data and the testing data may generally be received from the same data. That is, the data that is received from the sensors is split up, with one portion of the data being designated as the training data and the other portion being designated as the testing data. For example, about 60% of the data, about 70% of the data, about 80% of the data, about 90% of the data, or the like may be designated as training data, and the remaining portion of the data may be designated as the testing data. Other percentages are also acceptable without departing from the scope of the present disclosure.

The training data may refer to data that is used for the purposes of creating and/or updating a machine learning model of the electronic component. The testing data may refer to data that is used, based on the machine learning model, to determine whether an anomaly exists, to predict potential issues (i.e., determine whether a fault is likely to occur with the electronic device), or the like.

In block 406, the ECU of the vehicle may transmit the training data and the testing data to the machine learning server via the vehicle network access device and the server network access device. In embodiments in which the vehicle performs some or all of blocks 410 through 424, block 406 may be skipped.

In block 408, the machine learning server may receive the data. In particular, the training data and the testing data may be received by the machine learning processor of the machine learning server.

At block 410, the machine learning processor, or the ML-ECU of the vehicle, may begin generating a model of the electronic device using a machine learning algorithm. For example, the machine learning processor (or the ML-ECU) may use PCA to at least one of build or update the machine learning model of the electronic device. In that regard, the model may be a PCA model of the electronic device. In some embodiments, the model of the electronic device may be generated in a portion 428 of the method 400 that includes one or more of blocks 410, 412, and 414, and the portion 428 may be entirely referred to as PCA analysis.

Figure 5:
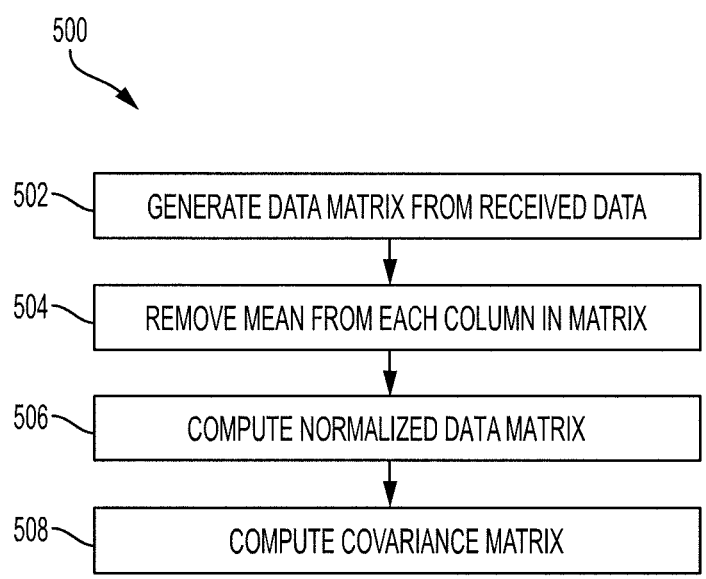
FIG. 5 is a flowchart illustrating an exemplary machine learning method using principal component analysis (PCA) according to an embodiment of the present invention.

Turning now to FIG. 5, a method 500 illustrates exemplary implementation of generating a PCA model, such as that performed in block 510. In block 502, a data matrix is generated from the data that is received. The data matrix may generally include each type of data that has been received from the one or more sensors and transmitted to the server computing device (or received by the ML-ECU). The data may include one or more of a device cycling current, a change in device temperature, a normalized junction-to-ambient thermal resistance, a power step, a device maximum junction temperature, a device minimum junction temperature, a Vcold measurement, a Vhot measurement, and a Von cycling measurement.

This data is illustrative only, and the data matrix may be generated from other types of data, fewer data types, or more data types without departing from the scope of the present disclosure. One illustrative example of matrix generation may include the following. A quantity of measurements may exist (e.g., three measurements: cycling current, Von cycling measurement and delta temperature), and each measurement may have a number of data samples (e.g., 2000). The measured data may be organized as a matrix X, an N by p matrix, where N=2000 is the quantity of data samples and p=3 is the quantity of features (e.g., attributes, measurements).

In block 504, the mean from each column in the data matrix may be removed such that a normalized data matrix can be computed at block 506. As such, the new, normalized matrix may reflect data that is on the same scale. That is, certain data received from a sensor may be on a larger scale than other data received from another sensor (e.g., first data may be on a first order of magnitude that is greater than second data on a second order of magnitude). Normalizing the data ensures that all of the data is on the same magnitude. Stated differently, because the features have different ranges of values, the variabilities of the features may be difficult to observe. Therefore, the mean of each feature may be removed to adjust all the features into similar ranges. One illustrative example of matrix normalization may include computing the mean of each column feature according to Equation (1) below and removing the mean from each column to form a new data matrix $X_1$ according to Equation (2) below:

$$\underline{m} = \frac{X^T \underline{e}}{N}; \underline{e} \sim N \text{ column vector of } 1^s \quad \text{Equation 1}$$

$$X_1 = X - \underline{e}\underline{m}^T = \left(I - \frac{\underline{e}\underline{e}^T}{N}\right)X \quad \text{Equation 2}$$

At block 506, a covariance matrix may be computed. That is, the variants of each of the data points may be calculated and placed into matrix form. The covariance matrix P generalizes the notion of variance to p=3 dimensions. Accordingly, the p by p (here, a 3 by 3) covariance matrix of data matrix $X_1$ described above may be computed according to Equation (3) below:

$$P = X_1^T X_1 \quad \text{Equation 3:}$$

In various embodiments, the method 500 may be performed using data from a single vehicle to create a model of the electronic device for the single vehicle. In some embodiments, the method 500 may be performed using data from multiple vehicles to create a single model that can be used for each of the multiple vehicles. For example, the method 500 may be performed to create a model of a power converter for a fleet of vehicles of the same type. As another example, the method 500 may be performed to create a model of a power converter for a fleet of vehicles that are located in the same geographical region.

Creating a single model for multiple vehicles may conserve processing power and memory. For example, only a single model of a power converter may be stored in a memory, and the single model may be used for a fleet of 20, 40, 100, 500, or the like vehicles.

In some embodiments, the machine learning processor may perform the method 500 to create a separate model for each vehicle using data collected from multiple vehicles. This may be advantageous when the machine learning processor fails to receive sensor data from a given vehicle for a period of time during which the electronic device or the corresponding sensor may begin to operate in a faulty manner. By building the model based on data from multiple vehicles, the model may be more accurate than if it were built using data from a sensor that is either faulty or corresponds to an at least partially faulty electronic component.

Returning reference to FIG. 4 and in block 412, Eigenvalues and Eigenvectors may be generated from the covariance matrix that was generated in block 508 of the method 500 of FIG. 5. For example, Eigen decomposition of the covariance matrix P may be performed and the Eigenvectors corresponding to the top k eigenvalues Equation (4) below:

$$\frac{\sum_{i=1}^{k}\lambda_i}{\text{trace}(P)} > Th \ (0.95) \qquad \text{Equation 4}$$

Where $P=V\Lambda V^T$; $\lambda_1 \geq \lambda_2 \geq L \geq \lambda_k \geq \lambda_{k+1} \geq L \geq \lambda_p$ If k=2 satisfies Equation (4), the top 2 Eigenvalues and the corresponding Eigenvectors may represent the most variability of all the data. As such, the top two Eigenvalues and the corresponding Eigenvectors may be selected in block 414. It should be understood that the top Eigenvalues that are selected represent the most variability in the data that was received by the sensors. In addition, it should be understood that more variability in the data that was received by the sensors is the most valuable for the purposes of extracting information therefrom and determining whether an anomaly exists for the purposes of predicting potential failures.

Although the portion 428 is shown to be performed using PCA analysis, the present disclosure is not limited to such an analysis. Other machine learning algorithms capable of generating and/or updating a model may be used in place of the portion 428 without departing from the scope of the present disclosure.

In block 416, a reduced data matrix or indicator $X_2$ may be generated from the received data for each vehicle. For example, the matrix $X_1$ can be simplified by multiplying the top 2 Eigenvectors. Equation (5) below may be used to calculate the reduced data matrix, where $V_k$ is a p=3 by k=2 matrix corresponding to the first 2 columns of V. The N=2000 by k=2 normalized principal component (PC) matrix may be represented by Equation (6) below:

$$X_2 = X_1 V_k \qquad \text{Equation 5:}$$

$$Y = X_2 \Lambda_k^{-1/2} \qquad \text{Equation 6:}$$

In addition, the N by p residual matrix, R and its p by p covariance matrix, E r may computed using Equation (7) below. The trend of residual may be used to distinguish failure types and data error when an anomaly occurs, indicating that the electronic component is likely to fail.

$$R = X_1[I_p - V_k V_k^T]$$

$$\Sigma_r = [I_p - V_k V_k^T] P [I_p - V_k V_k^T] \qquad \text{Equation 7:}$$

In block 418, the machine learning processor (or the ML-ECU) may perform a T squared ($T^2$) and Q statistical analysis of the resulting data to detect anomalies for each of the vehicles. In particular, Hotelling's $T^2$ statistic may be used as an anomaly detector, as depicted in Equation (8) below:

$$T^2(i) = \underline{x}_2^T(i) \Lambda_k^{-1} \underline{x}_2(i) = \underline{y}^T(i) \underline{y}(i); i=1,2,L,N \qquad \text{Equation 8}$$

In Equation 8, $\underline{x}_2^T$ is the $i^{th}$ row of the $X_2$ matrix, and $\underline{y}^T(i)$ is the $i^{th}$ row of Y. Here, $$T^2 \sim \frac{k(N-1)}{N-k} F_{k,N} \sim \chi_k^2$$

for large N where $F_{k,N}$ is the Fisher F-distribution with k and (N−k) degrees of freedom. The $x_k^2$ is the chi-squared distribution with k degrees of freedom. The threshold for $T^2$ statistic may be provided from the Chi-square distribution table based on the degrees of freedom and level of significance. If the top 2 Eigenvalues are selected, the degree of freedom is 2, and if 1% level of significance is selected, it means the values below the selected threshold has 99% confidence to follow the chi-squared distribution.

In addition, the Q-statistic may be used to check the validity of the model and as a second anomaly detector. The Q-statistic may be computed using Equation 9 below:

$$Q(i) = \underline{x}_1^T(i)[I_p - V_k V_k^T] x_1(i); i=1,2,L,N \qquad \text{Equation 9:}$$

In Equation 9, $\underline{x}_1^T$ is the $i^{th}$ row of the $X_1$ matrix, and $$Q \sim \sum_{i=k+1}^{p} \lambda_i z_i^2; z_i^2 \sim \chi_1^2.$$

The Q-statistic may generally be the sums of squares of the residuals for an observation vector after being fitted by the first k principal components. The Q-statistic is also a weighted combination of (p−k) chi-squared random variables where the weights are the (p−k) neglected Eigenvalues of the covariance matrix.

In block 420, the $T^2$ and Q analysis results may be compared with a threshold to determine whether an anomaly exists. In block 422, the machine learning processor may determine that a fault is likely to occur based on the comparison.

Figure 6:
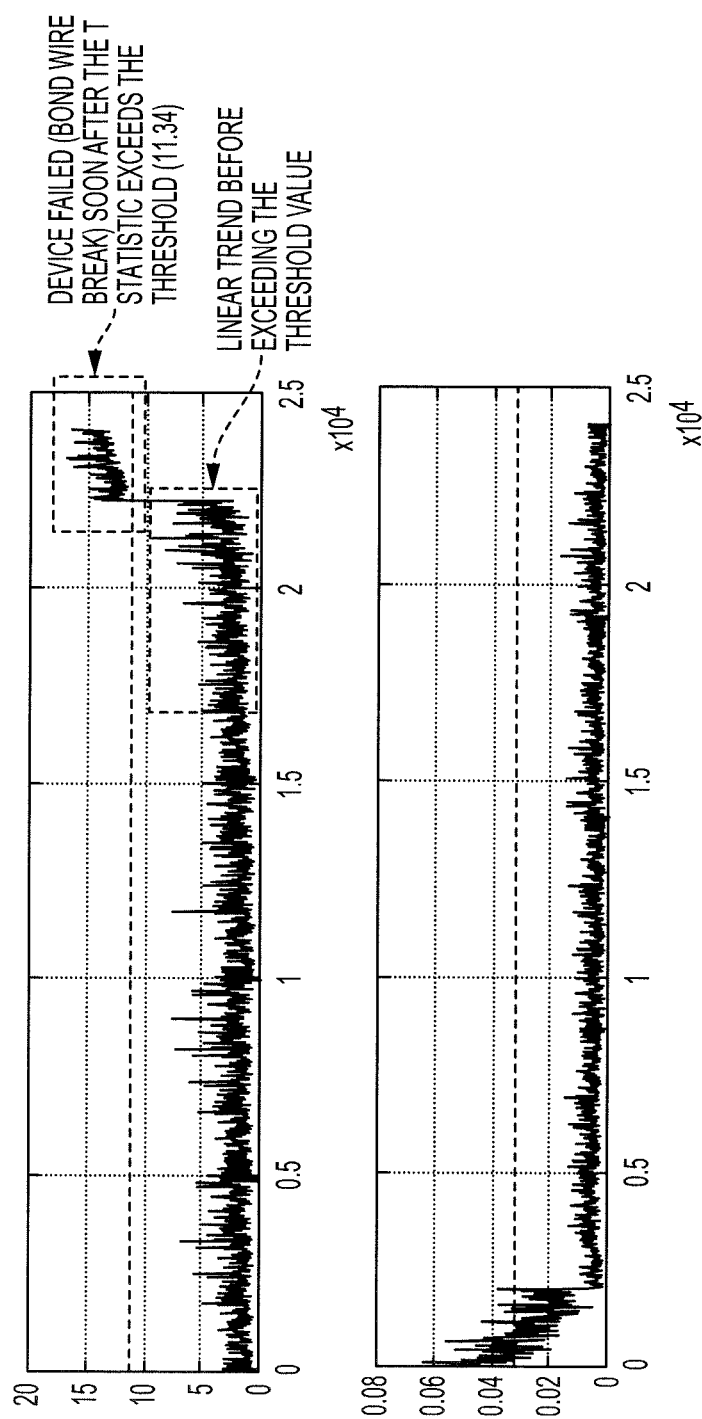
FIG. 6 is a graph illustrating T squared and Q statistical plots over a period of time according to an embodiment of the present invention.

For example, if the results of the analysis are above a threshold and/or trending toward a threshold, an anomaly may be determined, indicating that the electronic component is likely to fail (or that the PCA model is faulty). If the results of the analysis are below a threshold and/or are not trending toward a threshold, no anomaly may be determined, indicating that the electronic component is unlikely to fail relatively soon. For example, and as shown in FIG. 6, the threshold may be about be 11.34. When the results of the T squared analysis exceed the threshold, it may be determined that a failure is likely to occur. As such, when the results start trending towards the threshold, an anomaly may be determined in some embodiments, indicating that the fault is likely to occur. When the results of the Q analysis exceed the threshold, it may be determined that the model is faulty.

If a fault is unlikely to occur (i.e., if the data is not indicative of an anomaly), data may be stored for future reference, but no action may be taken at the time. Otherwise, if a fault is likely to occur, the machine learning server may transmit data to the vehicle indicating that the fault is likely to occur. In embodiments in which block 420, 422, and 424 are performed on the vehicle, block 424 may be skipped.

In block 426, the ECU of the vehicle may receive the data indicating that the fault is likely to occur and may control an output device to output such information. For example, an output device may include a check engine light, which an ECU may illuminate in response to receiving the data indicating that the fault is likely to occur. As another example, the output device may include a display, which an ECU may control to output text data indicating that the fault is likely to occur. In some embodiments, the machine learning server may output data to another source, such as a user device associated with the vehicle (such as a mobile phone, smart pad, or the like), a repair facility, a manufacturer, a fleet operator, or the like.

Figure 7:
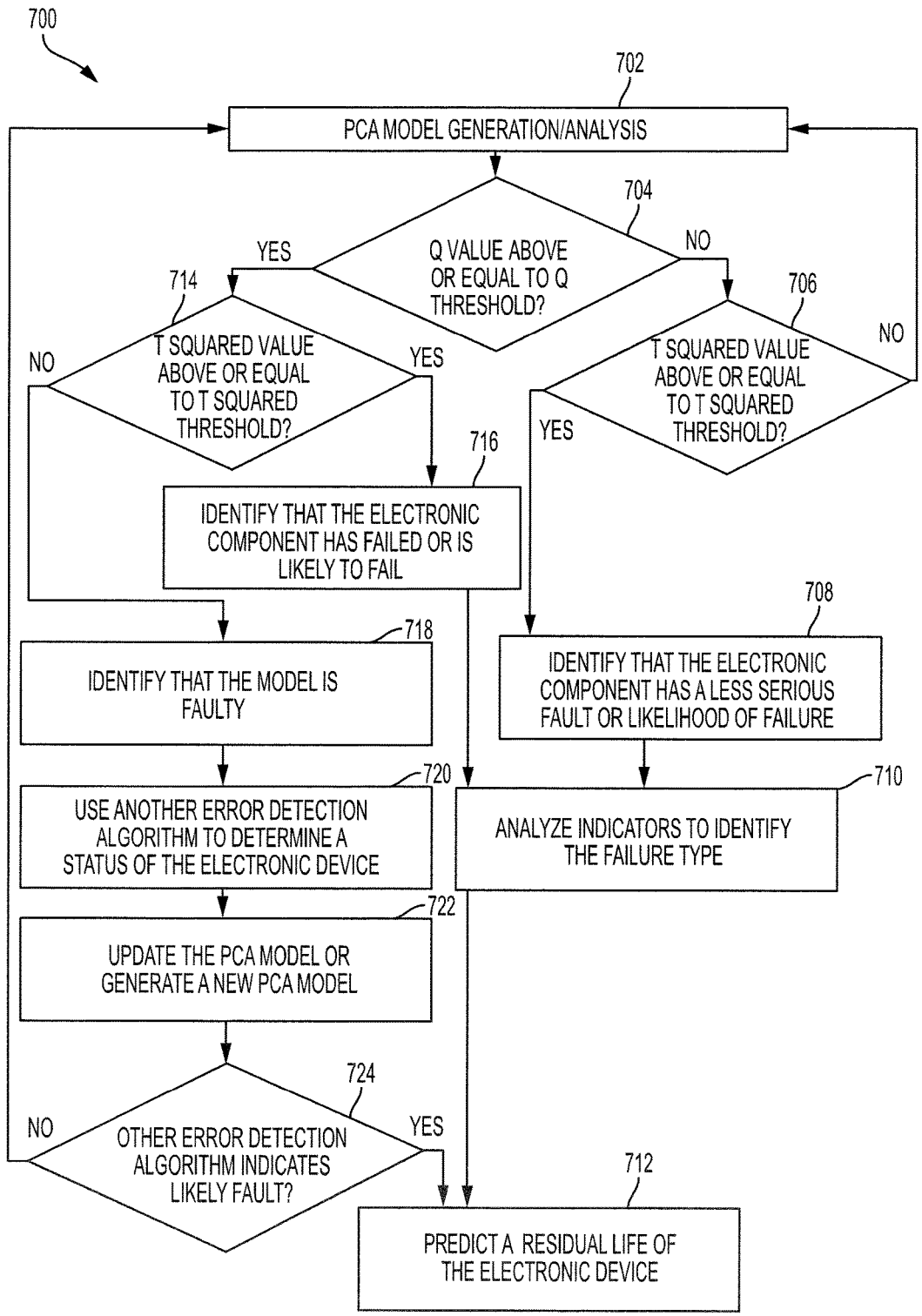
FIG. 7 is a flowchart illustrating a method for faults diagnosis and power electronics using an adaptive PCA model according to an embodiment of the present invention.

Turning now to FIG. 7, a method 700 may be performed by a machine learning processor of a machine learning server, a ML-ECU, or both, to determine a health status of an electronic device of a vehicle based on a model of the electronic device. The method 700 may also be used to determine whether the model of the electronic device is accurate, and to update the model or create a new model if the model is inaccurate. In that regard, the method 700 may be substituted for some of blocks 410 through 422 of FIG. 4.

In block 702, a machine learning processor (such as a machine learning processor of a machine learning server or a ML-ECU) may generate and/or analyze a model of an electronic device of a vehicle. For example, the model may be a PCA model, and block 702 may be performed in a similar manner as blocks 410 through 418 of the method 400 of FIG. 4. In that regard, the machine learning processor may determine a T squared threshold and a Q threshold in block 702.

In block 704, the machine learning processor may determine whether a current Q value (that is based on data received from a sensor associated with the electronic component) is greater than or equal to the Q threshold that was determined in block 702.

In block 706, if the Q value is less than the Q threshold then the machine learning processor may determine whether the T squared value is greater than or equal to the T squared threshold. If the T squared value is less than the T squared threshold then the method 700 may return to block 702 for continuing analysis of the electronic component using the model.

Block 708 may be reached if the Q value is less than the Q threshold and the T squared value is above (or equal to) the T squared threshold (the situation illustrated in FIG. 6). Such a situation may indicate that the electronic component has failed or is likely to fail, but that the failure may be of a relatively low severity. In that regard, the machine learning processor may determine that the electronic component has a less serious fault or a less serious likelihood of failure in block 708, as compared to a situation in which both the Q value reaches or exceeds the Q threshold and the T squared value reaches or exceeds the T squared threshold at the same time.

In block 710, the machine learning processor may analyze the specific indicators determined in the PCA analysis to identify the type of failure that has occurred or is likely to occur.

In block 712, if the electronic device is determined to be likely to fail, then the machine learning processor may predict a residual life of the electronic device. For example, the machine learning processor may predict the residual life based on a trend and the T squared value, based on the indicators analyzed in block 710, or the like.

In block 714, if the Q value is equal to or greater than the Q threshold, the machine learning processor may determine whether the T squared value is greater than or equal to the T squared threshold. In response to failure of the electronic device (or trending of the electronic device towards failure), the Q value and the T squared value may frequently reach or exceed their corresponding thresholds nearly simultaneously. Thus, if the T squared value is determined to be greater than or equal to, the T squared threshold, then the method 700 may proceed to block 716.

In block 716, the machine learning processor may determine that the electronic device has failed or is likely to fail. After making this determination, the machine learning processor may identify the failure type in block 710, and may predict a residual life of the electronic device in block 712 (if the electronic device is still operational).

Figure 8:
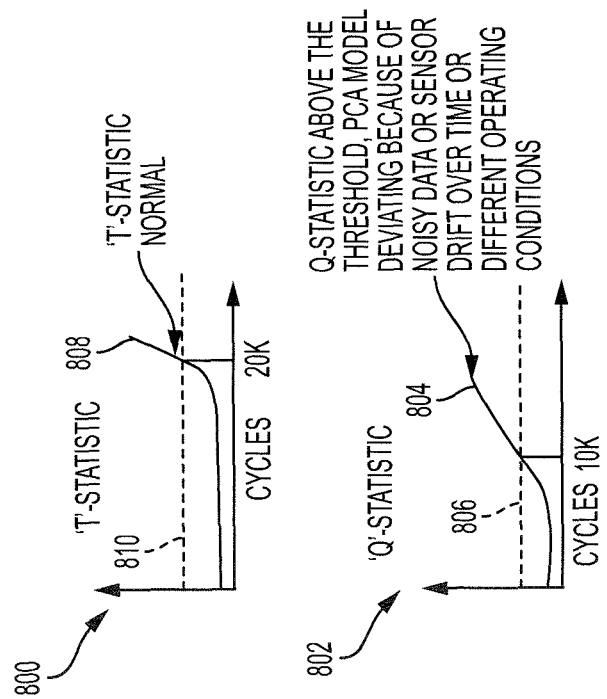
FIG. 8 is a graph illustrating T squared and Q statistical plots illustrating a situation that indicates a faulty PCA model according to an embodiment of the present invention.

In block 718, the machine learning processor may determine that the model is faulty when the Q value is greater than or equal to the Q threshold and the T squared value is less than the T squared threshold. For example and referring to FIG. 8, an exemplary T squared and Q analysis are shown on a $1^{st}$ plot 800 and a $2^{nd}$ plot 802, respectively. As shown, the Q value 804 exceeds the Q threshold 806 at 10,000 cycles, and the T squared value 808 exceeds the T squared threshold 810 at 20,000 cycles. Thus, it may be determined that the model of the electronic device has become faulty at 10,000 cycles.

Figure 9:
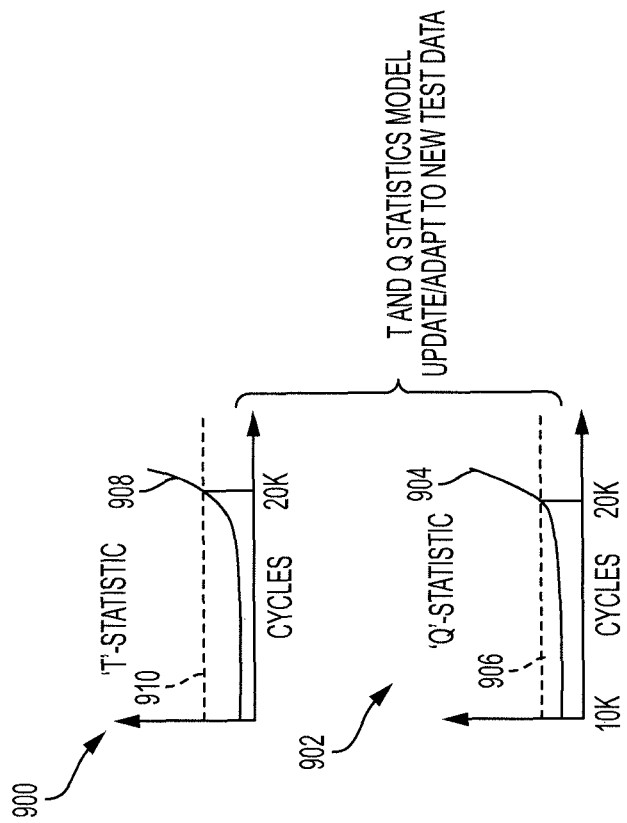
FIG. 9 is a graph illustrating T squared and Q statistical plots illustrating a situation that indicates that a fault has occurred or is likely to occur with a corresponding electronic device according to an embodiment of the present invention.

Contrast this with FIG. 9 which illustrates another exemplary T squared and Q analysis shown on a $1^{st}$ plot 900 and a $2^{nd}$ plot 902. As shown, the T squared value 908 exceeds the T squared threshold 910 at 20,000 cycles, at the same time as the Q value 904 exceeds the Q threshold 906. The results of the plots 900, 902 shown in FIG. 9 indicate that the corresponding electronic device has failed or is likely to fail, and that the failure may be more serious than the failure associated with the graphs of FIG. 6.

Returning reference to FIG. 7, the model may be faulty for various reasons. For example, the PCA model may be faulty if another fault occurs in a system that affects the electronic device, which may cause features to drift from their expected range or values for the original fault of interest. For example the electronic device may receive power from a power converter. If a fault occurs within the power converter that causes it to output a greater voltage, operation of the electronic device may change, resulting in the present PCA model being faulty, even though the electronic device is operating properly.

In block 720, after determining that the model of the electronic device is faulty, the machine learning processor may use another error detection algorithm (i.e., an algorithm that is different than the PCA model) to determine the status of the electronic device. For example, the machine learning processor may use a Euclidean distance, a Mahalanobis distance, or any other error detection algorithm to determine the status of the electronic device.

In block 722, the machine learning processor may update the PCA model or may generate a new PCA model when it has been determined that the model is faulty. For example, the machine learning processor may generate a new PCA model based on newly received data from the sensor that is associated with the electronic device. As another example, the machine learning processor may adjust the model or the Q threshold such that the Q value is less than the Q threshold, again indicating that the model of the electronic device is correct. In some embodiments, the machine learning processor may iteratively update the PCA model until the Q value is less than the Q threshold. In some embodiments, the machine learning processor may iteratively update the PCA model until the Q value is less than the Q threshold by a predetermined amount.

In some embodiments, the machine learning processor may update the PCA model or may generate the new PCA model regardless of whether a fault has occurred or is likely to occur with the electronic device.

In block 724, the machine learning processor may determine whether the other error detection algorithm indicates that a fault has occurred or is likely to occur with the electronic device. If the other error detection algorithm indicates that a fault has occurred or is likely to occur with the electronic device, the machine learning processor may predict a residual life of the electronic device in block 712. In some embodiments, the machine learning processor may predict the residual life of the electronic device using the other error detection algorithm. In some embodiments, the machine learning processor may predict the residual life of the electronic device using T squared and Q analysis based on the new or updated PCA model that was generated in block 722.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for analyzing a health status of a component of vehicles, comprising:
   an electronic device;
   a sensor configured to detect sensor data corresponding to at least one performance characteristic of the electronic device;
   a memory configured to store a machine learning algorithm; and
   a machine learning processor coupled to the sensor and configured to:
   receive the sensor data;
   generate, using the machine learning algorithm, a model of the electronic device to determine a T squared threshold and a Q threshold;
   perform a T squared analysis of the electronic device by comparing a T squared value to the T squared threshold;
   perform a Q analysis of the electronic device by comparing a Q value to the Q threshold;
   determine that the model of the electronic device is faulty when the T squared value is less than the T squared threshold and the Q value is greater than or equal to the Q threshold; and
   generate a new model of the electronic device or update the model of the electronic device when the model of the electronic device is determined to be faulty.

2. The system of claim 1 wherein the machine learning processor is further configured to perform an error detection algorithm that is different than the model of the electronic device to determine whether the electronic device has failed or is likely to fail when the model of the electronic device is faulty.

3. The system of claim 2 wherein the machine learning processor is further configured to predict a residual life of the electronic device based on at least one of the error detection algorithm or the T squared analysis when the electronic device is determined to be likely to fail.

4. The system of claim 2 wherein the machine learning processor is further configured to generate the new model of the electronic device or update the model of the electronic device when the error detection algorithm indicates that the electronic device has failed or is likely to fail.

5. The system of claim 1 wherein the machine learning processor is further configured to identify that the electronic device has failed or is likely to fail when the T squared value is equal to or greater than the T squared threshold.

6. The system of claim 1 wherein the machine learning processor is further configured to determine that a failure or likelihood of failure is less severe when the T squared value reaches or exceeds the T squared threshold before the Q value reaches or exceeds the Q threshold relative to when the T squared value reaches or exceeds the T squared threshold at the same time that the Q value reaches or exceeds the Q threshold.

7. The system of claim 1 wherein the model of the electronic device is a principal component analysis (PCA) model of the electronic device.

8. The system of claim 7 wherein the machine learning processor is further configured to generate eigenvalues and corresponding eigenvectors, and to determine the T squared threshold and the Q threshold based on the eigenvalues and the corresponding eigenvectors.

9. A system for analyzing a health status of a component of vehicles, comprising:
   an electronic device;
   a sensor configured to detect sensor data corresponding to at least one performance characteristic of the electronic device;
   a memory configured to store a machine learning algorithm; and
   a machine learning processor coupled to the sensor and configured to:
   receive the sensor data;
   generate, using the machine learning algorithm, a principal component analysis (PCA) model of the electronic device to determine a reduced data matrix;
   determine a T squared threshold and a Q threshold based on the reduced data matrix;
   perform a T squared analysis of the electronic device by comparing a T squared value to the T squared threshold;
   perform a Q analysis of the electronic device by comparing a Q value to the Q threshold;
   determine that the PCA model of the electronic device is faulty when the T squared value is less than the T squared threshold and the Q value is greater than or equal to the Q threshold; and
   generate a new PCA model of the electronic device or update the PCA model of the electronic device when the PCA model of the electronic device is determined to be faulty.

10. The system of claim 9 wherein the machine learning processor is further configured to perform an error detection algorithm that is different than the PCA model of the electronic device to determine whether the electronic device has failed or is likely to fail when the PCA model of the electronic device is faulty.

11. The system of claim 10 wherein the machine learning processor is further configured to predict a residual life of the electronic device based on at least one of the error detection algorithm or the T squared analysis when the electronic device is determined to be likely to fail.

12. The system of claim 10 wherein the machine learning processor is further configured to generate the new PCA model of the electronic device or update the PCA model of the electronic device when the error detection algorithm indicates that the electronic device has failed or is likely to fail.

13. The system of claim 9 wherein the machine learning processor is further configured to identify that the electronic device has failed or is likely to fail when the T squared value is equal to or greater than the T squared threshold.

14. The system of claim 9 wherein the machine learning processor is further configured to determine that a failure or likelihood of failure is less severe when the T squared value reaches or exceeds the T squared threshold before the Q value reaches or exceeds the Q threshold relative to when the T squared value reaches or exceeds the T squared threshold at the same time that the Q value reaches or exceeds the Q threshold.

15. The system of claim 9 wherein the machine learning processor is further configured to generate the reduced data matrix by generating eigenvalues and corresponding eigenvectors based on the PCA model of the electronic device and the sensor data.

16. A method for analyzing a health status of a component of vehicles, comprising:
   detecting, by a sensor, sensor data corresponding to at least one performance characteristic of an electronic device of a vehicle;
   storing, in a memory, a machine learning algorithm;
   receiving, by a machine learning processor, the sensor data;
   generating, by the machine learning processor using the machine learning algorithm, a model of the electronic device to determine a T squared threshold and a Q threshold;
   performing, by the machine learning processor, a T squared analysis of the electronic device by comparing a T squared value to the T squared threshold;
   performing, by the machine learning processor, a Q analysis of the electronic device by comparing a Q value to the Q threshold;
   determining, by the machine learning processor, that the model of the electronic device is faulty when the T squared value is less than the T squared threshold and the Q value is greater than or equal to the Q threshold; and
   at least one of generating, by the machine learning processor, a new model of the electronic device, or updating, by the machine learning processor, the model of the electronic device when the model of the electronic device is determined to be faulty.

17. The method of claim 16 further comprising determining, by the machine learning processor, whether the electronic device has failed or is likely to fail using an error detection algorithm that is different than the model of the electronic device when the model of the electronic device is faulty.

18. The method of claim 17 further comprising predicting, by the machine learning algorithm, a residual life of the electronic device based on at least one of the error detection algorithm or the T squared analysis when the electronic device determined to be likely to fail.

19. The method of claim 17 further comprising the at least one of generating the new model of the electronic device or updating the model of the electronic device when the error detection algorithm indicates that the electronic device has failed or is likely to fail.

20. The method of claim 16 further comprising determining, by the machine learning processor, that a failure or likelihood of failure is less severe when the T squared value reaches or exceeds the T squared threshold before the Q value reaches or exceeds the Q threshold relative to when the T squared value reaches or exceeds the T squared threshold at the same time that the Q value reaches or exceeds the Q threshold.

* * * * *